US009005798B2

(12) United States Patent
Park (10) Patent No.: US 9,005,798 B2
(45) Date of Patent: Apr. 14, 2015

(54) BATTERY PACK (75) Inventor: Hankyu Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 680 days.

(21) Appl. No.: 12/888,291

(22) Filed: Sep. 22, 2010

(65) Prior Publication Data
US 2011/0097619 A1 Apr. 28, 2011

(30) Foreign Application Priority Data

Oct. 27, 2009 (KR) ........................ 10-2009-0102078

(51) Int. Cl.
H01M 2/10 (2006.01)
H01M 2/18 (2006.01)
H01M 2/20 (2006.01)
H01M 10/42 (2006.01)

(52) U.S. Cl.
CPC .............. H01M 2/105 (2013.01); H01M 2/204 (2013.01); H01M 10/425 (2013.01)

(58) Field of Classification Search
CPC ..... H01M 2/0242; H01M 2/10; H01M 2/105; H01M 2/1077; H01M 2/1094
USPC ........................................ 429/152–154, 159
See application file for complete search history.

(56) References Cited

U.S. PATENT DOCUMENTS

2006/0093922 A1* 5/2006 Kim et al. ...................... 429/251
2006/0257725 A1* 11/2006 Wilk ................................ 429/99
2007/0190405 A1* 8/2007 Kang et al. ..................... 429/99
2007/0264562 A1* 11/2007 Kang et al. ..................... 429/96
2008/0233469 A1* 9/2008 Drozdz et al. .................. 429/61
2008/0305390 A1* 12/2008 Naito ............................. 429/159
2009/0029241 A1* 1/2009 Moon ........................... 429/100

FOREIGN PATENT DOCUMENTS

| CN | 101346832 A | 1/2009 |
| EP | 2 282 363 A1 | 6/2010 |
| JP | 2003-323870 A | 11/2003 |
| JP | 2004-158425 A | 6/2004 |
| JP | 2005-317456 | 11/2005 |
| JP | 2006-100147 A | 4/2006 |
| JP | 2006-134800 | 5/2006 |

(Continued)

OTHER PUBLICATIONS

Korean Office Action dated Mar. 22, 2011 for Korean Patent Application No. KR 10-2009-0102078 which corresponds to the captioned Application.

(Continued)

Primary Examiner — Jonathan G Leong
Assistant Examiner — James Erwin
(74) Attorney, Agent, or Firm — Knobbe, Martens, Olson & Bear, LLP (57) ABSTRACT A battery pack having lead wires connected to a plurality of unit batteries which are distributed to prevent malfunction of the batteries due to contact between the unit batteries and the lead wires. The lead wires are distributed within the minimum distances to facilitate a wire distributing process and reduce manufacturing costs. The battery pack includes unit batteries, a spacer disposed between the unit batteries, a protective circuit module connected to the unit batteries through lead wires, and a holder surrounding the unit batteries and having paths through with the lead wires pass, respectively.

21 Claims, 5 Drawing Sheets (56) References Cited

FOREIGN PATENT DOCUMENTS

| JP | 2006-134801 A | 5/2006 |
|---|---|---|
| JP | 2007-220613 A | 8/2007 |
| JP | 2008-047488 A | 2/2008 |
| JP | 2008-146854 A | 6/2008 |
| KR | 2007-0075711 | 7/2007 |

OTHER PUBLICATIONS

Japanese Office Action dated Jul. 31, 2012 for Japanese Patent Application No. JP 2009-281773 which shares priority of Korean Patent Application No. KR 10-2009-0102078 with captioned U.S. Appl. No. 12/888,291.

Japanese Notice of Allowance dated Dec. 4, 2012 for Japanese Patent Application No. JP 2009-281773 which shares priority of Korean Patent Application No. KR 10-2009-0102078 with captioned U.S. Appl. No. 12/888,291.

Chinese Office Action dated Mar. 11, 2013 for Chinese Patent Application No. 201010526026.1 which shares priority of Korean Patent Application No. KR 10-2009-0102078 with captioned U.S. Appl. No. 12/888,291.

Second Chinese Office Action dated Oct. 25, 2013 for Chinese Patent Application No. CN 201010526026.1 which shares priority of Korean Patent Application No. KR 10-2009-0102078 with captioned U.S. Appl. No. 12/888,291.

Extended European Search Report dated Sep. 4, 2014 for European Application No. EP 10 188 758.6 which shares priority of Korean Patent Application No. KR 10-2009-0102078 with captioned U.S. Appl. No. 12/888,291.

\* cited by examiner

BATTERY PACK

CROSS-REFERENCE TO RELATED APPLICATION

This application claims the benefit of Korean Patent Application No. 10-2009-0102078, filed Oct. 27, 2009 in the Korean Intellectual Property Office, the disclosure of which is incorporated herein by reference.

BACKGROUND

1. Field

Embodiments relate to a battery pack, and more particularly, to a high power and high capacity battery pack including a plurality of unit batteries.

2. Description of the Related Technology

Secondary batteries, unlike primary batteries, are rechargeable. Low capacity secondary batteries are used in small portable electronic devices such as phones, notebook computers, camcorders and other similar small portable electronic devices. High capacity secondary batteries are widely used as motor-driving power sources of hybrid vehicles.

Such secondary batteries include cylinder type batteries and prismatic type batteries. In order to drive a motor of a device requiring high capacity, e.g. a motor of an electric vehicle or a hybrid vehicle, a plurality of high power secondary batteries are connected in series to constitute a high capacity secondary battery.

As such, a single high capacity secondary battery, i.e., a battery module, includes unit batteries that are connected in series. Each of the unit batteries includes an electrode assembly having a positive electrode plate, a negative electrode plate, and a separator therebetween, a case receiving the electrode assembly, a cap assembly coupled to the case to close the case, and positive and negative terminals. The positive and negative terminals protrude from the cap assembly and are connected electrically to collectors of the positive and negative electrode plates provided to the electrode assembly. Thus, the unit batteries cells of the battery module are spaced apart from each other and are connected in series or in parallel through electrode tabs. The battery module is inserted into a spacer separating the unit batteries apart from each other. The battery module is electrically connected to a protective circuit module and is disposed in an outer case to constitute a battery pack.

In the battery pack described above, lead wires extending from the protective circuit module contact the unit batteries because a structure for distributing the lead wires is not provided. Thus, when the unit batteries are overheated, the lead wires may melt or become welded so as to contact each other or the unit batteries, and the protective circuit module fails to work.

In addition, when a position where the lead wire extends from the protective circuit module is disposed on an opposite side to a position where the lead wire is connected to the unit battery, it is difficult to distribute the lead wire. Furthermore, since the lead wires extend along connection portions of the unit batteries, the extension lengths of the lead wires are increased, and thus manufacturing costs are increased.

SUMMARY

Aspects of the present invention provide a battery pack configured to distribute lead wires connected to a plurality of unit batteries in order to prevent malfunction of the batteries due to contact between the unit batteries and the lead wires.

Aspects of the present invention provide a battery pack configured to distribute lead wires connected to a plurality of unit batteries within minimum distances, thus facilitating a wire distributing process and reducing manufacturing costs.

Aspects of the present invention provide a battery pack including: unit batteries; a spacer disposed between the unit batteries to separate adjacent pairs of the unit batteries; a protective circuit module connected to the unit batteries through lead wires; and a holder surrounding the unit batteries and having paths through which the lead wires pass, respectively.

According to another aspect of the present invention, the holder may include separation walls respectively separating and guiding the lead wires to the unit batteries.

According to another aspect of the present invention, the holder may include hooks binding the lead wires.

According to another aspect of the present invention, the holder may include a top plate and side plates surrounding upper portions and side portions of the unit batteries, respectively.

According to another aspect of the present invention, the holder may be provided with a substrate install part disposed on a top surface of the holder and on which the protective circuit module is installed.

According to another aspect of the present invention, the protective circuit module may include a circuit balancing a current or a voltage of the unit batteries.

According to another aspect of the present invention, the unit batteries may be cylinder type batteries arrayed in a multi-layer structure, and neighboring unit batteries of the unit batteries may have opposite polarities facing a same side.

According to another aspect of the present invention, the spacer may include: a body having a plate shape with a plurality of seat surfaces corresponding to outer surfaces of the unit batteries; and partition walls disposed between the seat surfaces and including a heat diffusion recess.

According to another aspect of the present invention, the spacer may include a lead wire holes disposed in a longitudinal direction of the spacer. The lead wires pass through the lead wire holes to facilitate a wiring process.

According to another aspect of the present invention, the spacer may be formed of soft plastic. The soft plastic may include at least one of polyethylene (PE), polypropylene (PP), polyvinyl chloride (PVC), polystyrene (CPS), polyethylene terephthalate (PETE).

According to another aspect of the present invention, the battery pack may further include a case receiving the unit batteries and the spacer.

According to another aspect of the present invention, the case may include: a bottom case receiving the unit batteries and the spacer; and a top case closing an open part of the bottom case.

According to another aspect of the present invention, the bottom case may include a bottom plate; and seat recess parts disposed on the bottom plate, wherein the seat recess parts may have a semicircular cross-section, wherein the seat recess parts are arranged in a lattice, and wherein the unit batteries may be placed on the seat recess parts.

According to another aspect of the present invention, the battery pack may further include an electrode tabs electrically connecting the unit batteries to each other and connecting to the lead wires.

According to another aspect of the present invention, the electrode tabs may include contacts welded to the unit batteries, and lead wire connections connected to the lead wires.

According to another aspect of the present invention, an insulation tape may be attached to the electrode tabs to protect the electrode tabs.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
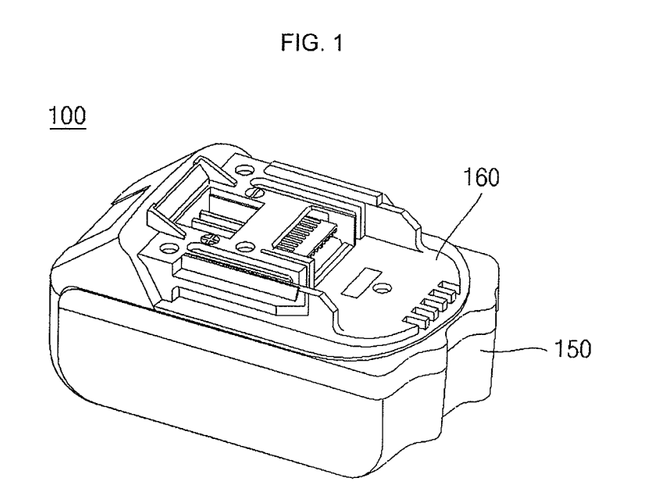
FIG. 1 illustrates a perspective view of a battery pack according to an embodiment of the present invention.
Figure 2:
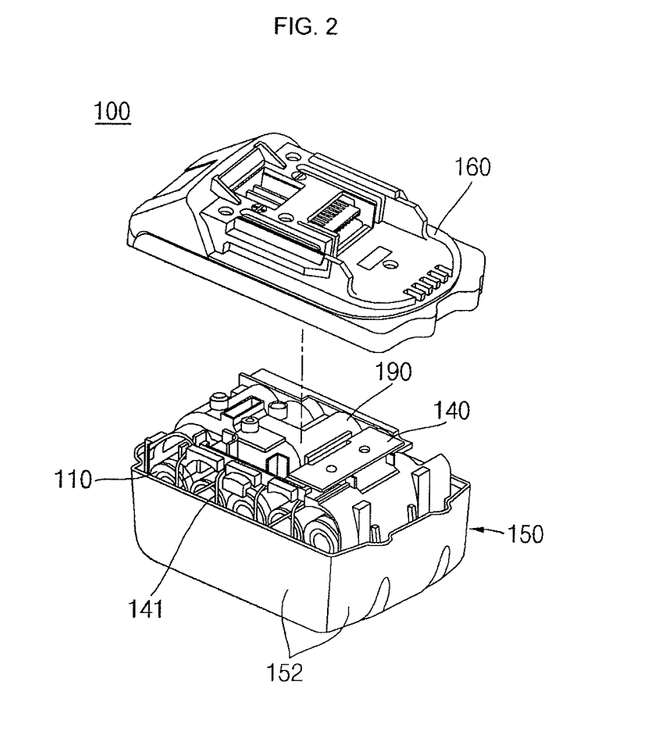
FIG. 2 illustrates a schematic view the battery pack wherein a top case is removed from the battery pack according to an embodiment of the present invention.
Figure 3:
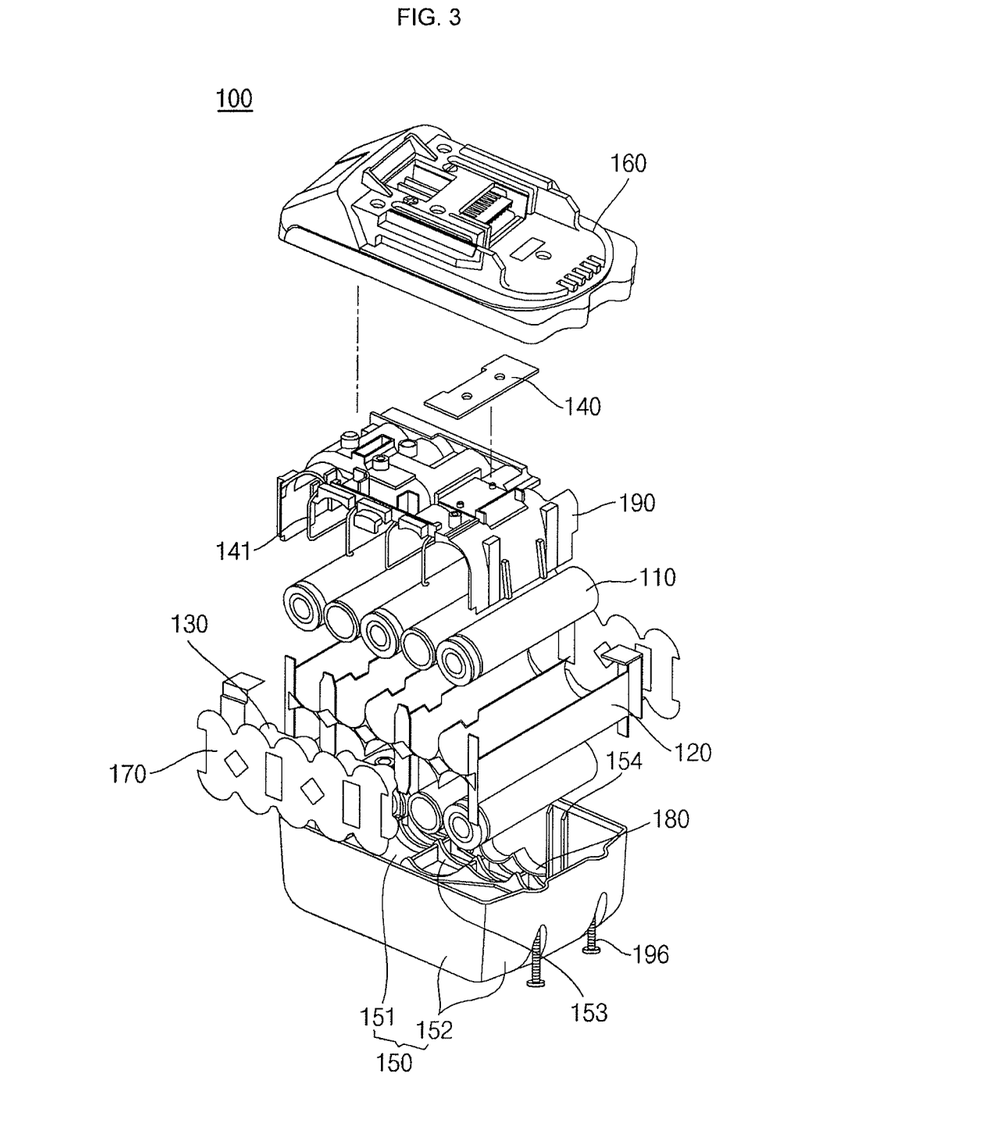
FIG. 3 illustrates an exploded perspective view of a battery pack according to an embodiment of the present invention.
Figure 4:
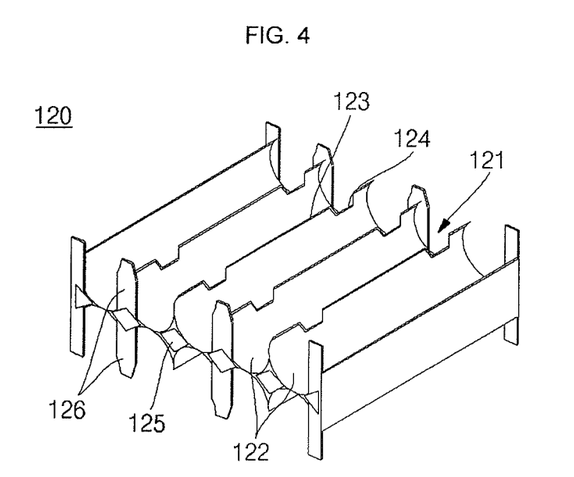
FIG. 4 illustrates a perspective view of a spacer according to an embodiment of the present invention.
Figure 5:
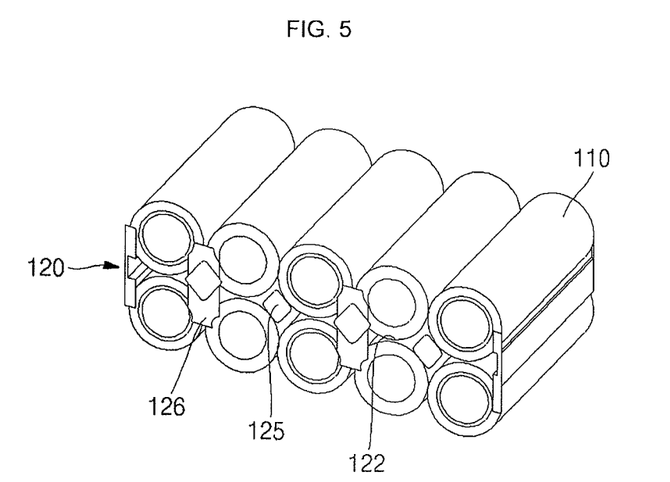
FIG. 5 illustrates a schematic view of the spacer of FIG. 4.
Figure 6:
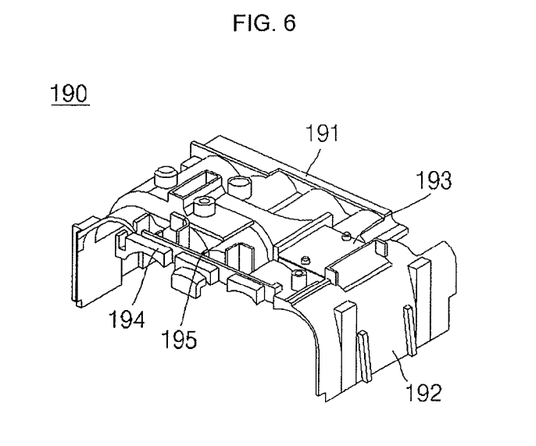
FIG. 6 illustrates a perspective view of a holder according to an embodiment of the present invention.
Figure 7:
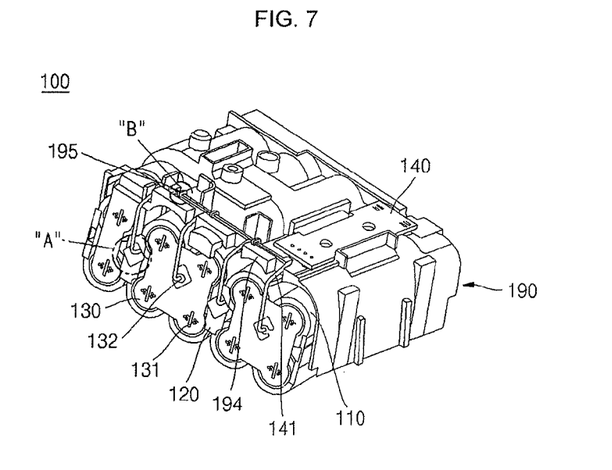
FIG. 7 illustrates a schematic view of the holder of FIG. 6 and unit batteries.
Figure 8:
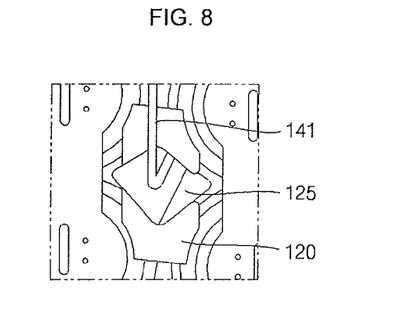
FIG. 8 illustrates an enlarged view of a portion 'A' of FIG. 7.
Figure 9:
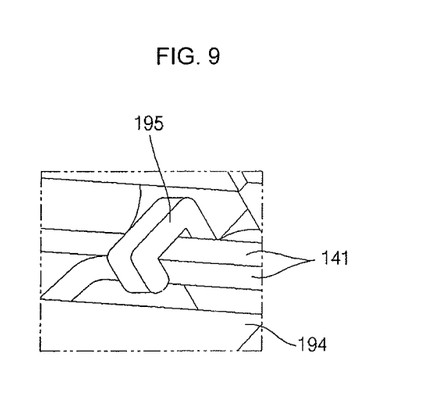
FIG. 9 illustrates an enlarged view of a portion 'B' of FIG. 7.

FIG. 1 illustrates a perspective view of a battery pack 100 according to an embodiment of the present invention. FIG. 2 illustrates a schematic view the battery pack 100 wherein a top case 160 is removed from the battery pack 100 according to an embodiment of the present invention. FIG. 3 illustrates an exploded perspective view of the battery pack 100 according to an embodiment of the present invention. FIG. 4 illustrates a perspective view of a spacer 120 according to an embodiment of the present invention. FIG. 5 illustrates a schematic view of the spacer 120 of FIG. 4 and unit batteries 110. FIG. 6 illustrates a perspective view of a holder 190 according to an embodiment of the present invention. FIG. 7 illustrates a schematic view of the holder 190 of FIG. 6 and unit batteries 110.

Referring to FIGS. 1 through 7, the battery pack 100 includes a plurality of unit batteries 110, a spacer 120, electrode tabs 130, a protective circuit module 140, and a holder 190. The spacer 120 separates the unit buttons 1110. The electrode tabs 130 connect the unit batteries 110 in series or in parallel. The protective circuit module 140 is connected to the unit batteries 110 and lead wires 141. The holder 190 surrounds the unit batteries 110 and has paths through which the lead wires 141 pass.

The battery pack 100 further includes an insulation tape 170 attached to the outer surfaces of the electrode tabs 130, a cushion tape 180, and a bottom case 150 accommodating the insulation tape 170 and the cushion tape 180.

The shown unit batteries 110 are cylinder type batteries, however aspects of the present invention are not limited thereto. Five unit batteries 110 are arranged in series, and two groups of the five unit batteries 110 are arranged in two layers. Neighboring unit batteries 110 have different poles facing a same direction. That is, when an end of one of the neighboring unit batteries 110 has a positive pole (+) facing in one direction, an end of another one of the neighboring unit batteries 110 has a negative pole (−) facing in the one direction. While shown with 5 unit batteries 110 arranged in two layers, other numbers of layers can be used, and other numbers of batteries can be in each layer.

As illustrated in FIG. 4, the spacer 120 includes a spacer body 121 having a plate shape provided with semicircular seat surfaces 122 corresponding to outer surfaces of the cylinder type unit batteries 110. Five seat surfaces 122 are provided on each of the upper and lower surfaces of the spacer body 121. Partition walls 123 are disposed between the seat surfaces 122. The upper portions of the partition walls 123 are provided with heat diffusion recesses 124.

Lead wire holes 125 pass through the spacer 120 in the longitudinal direction of the spacer body 121. The lead wire holes 125 are disposed between two seat surfaces 122 disposed in the upper layer and two seat surfaces 122 disposed in the lower layer. In FIG. 4, the number of the lead wire holes 125 is four.

Both ends of the spacer body 121 are provided with stop ribs 126 that prevent movement of the unit batteries 110. The stop rib 126 is provided to at least one end side of the seat surface 122. Thus, the stop ribs 126 prevent the unit batteries 110 from being removed from the spacer body 121. The stop ribs 126 are disposed on both the upper and lower sides of the lead wire holes 125. As illustrated in FIG. 4, the stop ribs 126 are provided to a first side of the seat surface 122 of the spacer body 121, but are not provided to an adjacent second side of the seat surface 122. In the next seat surface 122, the stop ribs 126 are provided only to a second side, but not provided to a first side. In other words, the stop ribs 126 are provided on alternating partition walls 123. As such, although the stop ribs 126 are provided alternately to first and second sides of the seat surfaces 122 of the spacer body 121, movement and removal of the unit batteries 110 can be prevented. Accordingly, since the stop ribs 126 are disposed alternately at both ends of the spacer body 121, the stop ribs 126 do not interfere with the electrode tabs 130 where the electrode tabs 130 are welded to the unit batteries 110.

The spacer 120 is formed of soft plastic that includes at least one of polyethylene (PE), polypropylene (PP), polyvinyl chloride (PVC), polystyrene (CPS), polyethylene terephthalate (PETE), or an equivalent thereof. However, aspects of the present invention are not limited thereto and other plastics or similar materials may be used to form the spacer 120. The soft plastic absorbs shock, and supports and protects the unit batteries 110.

As illustrated in FIG. 7, the electrode tab 130 connects two or four neighboring unit batteries 110 on the upper and lower sides such that they are in series. Four corners or both ends of the electrode tab 130 are provided with contacts 131 that are welded to the positive poles (+) or the negative poles (−) of the unit batteries 110. The center of the electrode tab 130 is provided with lead wire connections 132 connected to the lead wires 141. The electrode tabs 130 are formed of metal having a high conductivity, which may include at least one of nickel, aluminum, copper, and silver. However, aspects of the present invention are not limited thereto, and other suitable metals may be used to form the electrode tabs 130.

The protective circuit module 140 is provided with a protective circuit (not shown) or an electric device (not shown) that protects the unit batteries 110 when being over-discharged or over-charged. The protective circuit module 140 further includes a circuit configured to balance a current and a voltage when the unit batteries 110 are charged or discharged.

The lead wires 141 extend from the protective circuit module 140. The lead wires 141 connect the protective circuit module 140 to the unit batteries 110. The lead wires 141 pass through the lead wire holes 125 of the spacer 120, and are then fixed to the lead wire connections 132 of the electrode tabs 130.

The bottom case 150 receives the unit batteries 110, the spacer 120, the electrode tabs 130, and the protective circuit module 140, and a top case 160 closes an open upper part of the bottom case 150 when the bottom case 150 has received the unit batteries 110, the spacer 120, the electrode tabs 130, and the protective circuit module 140. The bottom case 150 includes a bottom plate 151 and four sidewalls 152 extending upward from edges of the bottom plate 151.

The inner bottom surface of the bottom plate 151 is provided with a plurality of seat recess parts 153 having a semicircular cross-section, and the unit batteries 110 are placed on the seat recess parts 153. The seat recess parts 153 are arrayed in a lattice at the bottom plate 151. A plurality of gap prevention ribs 154 are provided to the inner surfaces of the sidewalls 152.

The top case 160 has a shape and a size formed so as to close the open upper part of the bottom case 150. Thus, the top case 160 has a plate shape to cover the bottom case 150 approximately having a box shape.

The insulation tape 170 is attached to the outer surfaces of the electrode tabs to protect the electrode tabs 130. The cushion tape 180 prevents the unit batteries 110 placed on the upper surface of the bottom plate 151 from directly contacting the bottom plate 151.

The holder 190, as illustrated in FIG. 6, includes a top plate 191 and side plates 192 integrally formed with the top plate 191. Thus, the holder 190 surrounds the top surface and side surfaces of the unit batteries 110 to protect the unit batteries 110 from external shock. The top surface of the top plate 191 of the holder 190 is provided with a substrate install part 193 on which the protective circuit module 140 is installed. Both ends of the top plate 191 are provided with separation walls 194 that respectively separate the lead wires 141 extending from the protective circuit module 140 and guide them to the unit batteries 110. The upper sides of the separation walls 194 are respectively provided with hooks 195 configured to bind the lead wires 141 guided by the separation walls 194. The hook 195 is bent two times, however, aspects of the present invention are not limited thereto and the hook 195 may be bent a number of times greater or less than two times.

A method of assembling a battery pack configured as described above, and functions of the assembled battery pack will now be described with reference to FIGS. 1 through 9 according to an embodiment of the present invention.

The unit batteries 110 are placed on the seat surfaces 122 on both sides of the spacer 120 such that the neighboring unit batteries 110 have the reverse polarities. The heat diffusion recesses 124 are provided to the partition walls 123 between the seat surfaces 122 to diffuse heat generated from the unit batteries 110 to the outside. The stop ribs 126, alternately disposed at both the ends of the spacer body 121, prevent the unit batteries 110 from being removed from the spacer 120.

The stop ribs 126 support both the ends of the unit batteries 110 to prevent the unit batteries 110 from being moved by external shock.

The electrode tabs 130 are welded to both ends of at least two of the unit batteries 110, respectively. Thus, the unit batteries 110 connected to the electrode tabs 130 are connected to each other in series or in parallel.

The insulation tape 170 is attached to the outer surfaces of the electrode tabs 130. The insulation tape 170 has a shape corresponding to the electrode tabs 130 to protect the electrode tabs 130 from contacting the bottom case 150.

The upper side of the unit batteries 110 are coupled to the holder 190. The top plate 191 of the holder 190 envelops the upper surfaces of the unit batteries 110, and the side plates 192 surround the side surfaces of the unit batteries 110. The protective circuit module 140 is installed on the substrate install part 193 provided to the top plate 191 of the holder 190. The lead wires 141 extend out of the protection circuit board 140.

The lead wires 141 are connected to the electrode tabs 130 which are respectively welded to the unit batteries 110. That is, four lead wires 141 extending from the protective circuit module 140 are guided to the unit batteries 110 by the separation walls 194. Thus, two of the four lead wires 141 extending from the protective circuit module 140 are connected directly to the lead wire connections 132 of the electrode tabs 130. The other two of the four lead wires 141 pass through the lead wire holes 125 provided to the spacer 120, and then, are connected to the lead wire connections 132 of the electrode tabs 130 welded on the opposite side to the two lead wires 141 because the neighboring unit batteries 110 have different poles facing the same side. Thus, the lead wires 141 extending from the protective circuit module 140 are connected to the electrode tabs 130 of the unit batteries 110 within minimum distances. When at least two of the four lead wires 141 separated by the separation walls 194 are distributed together, the distributed two lead wires 141 are bound by the hooks 195. Thus, although the lead wires 141 are provided in plurality, the lead wires 141 do not contact the unit batteries 110. Furthermore, even when external shock is applied to the bound lead wires 141, the bound lead wires 141 are not removed from the hooks 195.

As such, a battery module obtained by assembling the unit batteries 110 placed on the spacer 120, the electrode tabs 130, and the protective circuit module 140 is stored in the bottom case 150.

Since the battery module disposed on the bottom plate 151 of the bottom case 150 is placed on the cushion tape 180, the battery module is protected against shock generated from the bottom plate 151. The unit batteries 110, which are not enveloped by the holder 190, or in other words, the unit batteries 110 in a lower layer, are placed respectively on the seat recess parts 153 provided to the bottom plate 151 of the bottom case 150. The spacer 120 is in close contact with the gap prevention ribs 154 provided to the sidewalls 152 of the bottom case 150. As such, the spacer 120 is not moved.

Next, the battery module including the unit batteries 110, the spacer 120, the electrode tabs 130, and the protective circuit module 140, is accommodated in the bottom case 150. Then, the bottom case 150 is coupled to the top case 160 through screws 196 to complete the assembling of the battery pack 100.

According to aspects of the present invention, the high capacity and high power battery pack prevents malfunction of the unit battery due to heat welding of the lead wires distributed in the battery pack when the batteries emit heat.

According to aspects of the present invention, the lead wires connected to the unit batteries are distributed within the minimum distances, thus improving an assembly process and reducing manufacturing costs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
a plurality of unit batteries;
a spacer disposed between the unit batteries to separate adjacent pairs of the unit batteries, wherein the spacer comprises i) a body having a plurality of seat surfaces corresponding to outer +surfaces of the unit batteries and ii) a plurality of partition walls formed between the seat surfaces;
a protective circuit module connected to the unit batteries through a plurality of lead wires; and
a holder surrounding the unit batteries and having paths through which the lead wires pass, respectively,
wherein the spacer comprises a plurality of lead wire holes through which the lead wires pass, respectively, wherein the spacer further comprises a plurality of stop ribs configured to substantially prevent movement of the unit batteries, and wherein the stop ribs are formed only on alternating partition walls.

2. The battery pack as claimed in claim 1, wherein the holder comprises separation walls respectively separating and guiding the lead wires to the unit batteries.

3. The battery pack as claimed in claim 1, wherein the holder comprises hooks binding the lead wires.

4. The battery pack as claimed in claim 1, wherein the holder comprises a top plate and side plates surrounding upper portions and side portions of the unit batteries, respectively.

5. The battery pack as claimed in claim 1, wherein the holder comprises a substrate install part disposed on a top surface of the holder and on which the protective circuit module is installed.

6. The battery pack as claimed in claim 1, wherein the protective circuit module comprises a circuit balancing a current or a voltage of the unit batteries.

7. The battery pack as claimed in claim 1, wherein the unit batteries are cylinder type batteries arrayed in a multi-layer structure, and neighboring unit batteries of the unit batteries have opposite polarities facing a same side.

8. The battery pack as claimed in claim 1, wherein each of the partition walls includes a heat diffusion recess.

9. The battery pack as claimed in claim 1, wherein the spacer is formed of soft plastic.

10. The battery pack as claimed in claim 9, wherein the soft plastic comprises at least one of polyethylene (PE), polypropylene (PP), polyvinyl chloride (PVC), polystyrene (CPS), polyethylene terephthalate (PETE).

11. The battery pack as claimed in claim 1, further comprising a case receiving the unit batteries and the spacer.

12. The battery pack as claimed in claim 11, wherein the case comprises:
a bottom case receiving the unit batteries and the spacer; and
a top case closing an open part of the bottom case.

13. The battery pack as claimed in claim 12, wherein the bottom case comprises:
a bottom plate; and
seat recess parts disposed on the bottom plate,
wherein the seat recess parts have a semicircular cross-section,
wherein the seat recess parts are arranged in a lattice, and
wherein the unit batteries are placed on the seat recess parts.

14. The battery pack as claimed in claim 1, further comprising an electrode tabs electrically connecting the unit batteries to each other and connecting to the lead wires.

15. The battery pack as claimed in claim 14, wherein the electrode tabs comprise contacts welded to the unit batteries, and lead wire connections respectively connected to the lead wires.

16. The battery pack as claimed in claim 14, wherein an insulation tape is attached to the electrode tabs to protect the electrode tabs.

17. The battery pack as claimed in claim 1, wherein the battery pack further comprises a first layer of unit batteries and a second layer of unit batteries.

18. The battery pack as claimed in claim 8, wherein the spacer comprises a first layer of seat surfaces and a second layer of seat surfaces.

19. A battery pack comprising:
a plurality of unit batteries;
a plurality of lead wires connected to the unit batteries, respectively;
a protective circuit module connected to the unit batteries through the respective lead wires; and
a spacer disposed between the unit batteries and having lead wire holes disposed in a longitudinal direction of the spacer and in which the lead wires pass through, wherein the spacer comprises i) a body having a plurality of seat surfaces corresponding to outer surfaces of the unit batteries, ii) a plurality of partition walls formed between the seat surfaces and iii) a plurality of stop ribs configured to substantially prevent movement of the unit batteries, and wherein the stop ribs are formed only on alternating partition walls.

20. The battery pack as claimed in claim 1, wherein each of the lead wires is electrically connected to a plurality of unit batteries.

21. The battery pack as claimed in claim 1, wherein each stop rib is configured to substantially prevent movement of four unit batteries.

* * * * *